United States Patent [19]

Chae

[11] Patent Number: 5,631,764
[45] Date of Patent: May 20, 1997

[54] ELECTRODISPLACIVE ACTUATOR FOR USE IN AN ACTUATED MIRROR ARRAY

[75] Inventor: Song Chae, Seoul, Rep. of Korea

[73] Assignee: Daewoo Electronics Co., Ltd., Seoul, Rep. of Korea

[21] Appl. No.: 216,757

[22] Filed: Mar. 23, 1994

[30] Foreign Application Priority Data

Mar. 23, 1993 [KR] Rep. of Korea .................. 93-4504
Mar. 23, 1993 [KR] Rep. of Korea .................. 93-4505

[51] Int. Cl.⁶ .................. G02B 5/08; G02B 26/00; H01L 41/04
[52] U.S. Cl. .................. 359/224; 359/291; 359/846; 359/855; 310/328; 310/366
[58] Field of Search .................. 359/224, 225, 359/246, 248, 291, 295, 323, 846, 849, 850, 855, 900; 310/328, 366; 29/25.35

[56] References Cited

U.S. PATENT DOCUMENTS

| | | | |
|---|---|---|---|
| 3,463,572 | 8/1969 | Preston, Jr. .................. | 359/295 |
| 3,904,274 | 9/1975 | Feinleib et al. .................. | 359/295 |
| 5,159,225 | 10/1992 | Um .................. | 310/328 |
| 5,175,465 | 12/1992 | Um et al. .................. | 310/328 |
| 5,260,798 | 11/1993 | Um et al. .................. | 358/233 |
| 5,287,215 | 2/1994 | Warde et al. .................. | 359/291 |
| 5,301,404 | 4/1994 | Ochiai et al. .................. | 29/25.35 |

FOREIGN PATENT DOCUMENTS

| | | | |
|---|---|---|---|
| 0023418 | 1/1991 | Japan .................. | 359/323 |
| 3-269511 | 12/1991 | Japan .................. | 359/323 |

Primary Examiner—Ricky D. Shafer
Attorney, Agent, or Firm—Anderson Kill & Olick P.C.

[57] ABSTRACT

An actuator for tilting the plane of a mounted mirror comprises a substrate having an opening filled with a first metalization; a pair of electrodisplacive members mounted on the substrate, each electrodisplacive member having a side surface in a facing relationship with a second metalization formed therebetween and a grooved surface opposite therefrom with a third metalization formed thereon, the electrodisplacive members further having a polarization selected so that a voltage applied between the second metalization and the third metalization causes one of the electrodisplacive members to vertically expand and the other to vertically contract, thereby tilting the plane of the mounted mirror; a metal layer having predetermined dimensions, provided underneath the second metalization; and an electrically conductive adhesive paste layer disposed between the metal layer and the first metalization for providing an electrical contact therebetween. The metal layer being provided between the second metalization and the paste layer, such that a possible increase of the contact resistance between the first metalization and the second metalization is prevented, rendering the tilting operation of the mounted mirror upon application of such voltage to the first metalization controllable or accurate.

7 Claims, 3 Drawing Sheets

ELECTRODISPLACIVE ACTUATOR FOR USE IN AN ACTUATED MIRROR ARRAY

FIELD OF THE INVENTION

The present invention relates to electrodisplacive actuators and, more particularly, to electrodisplacive actuators for actuating a mirror array mounted thereon in an optical projection video display system.

BACKGROUND OF THE INVENTION

In certain of optical projection video display systems, a mirror array is illuminated from an optical energy source. In such a system, the orientation of each of the mirrors is electronically perturbed to determine a propagation path for a beam of light reflecting from each mirror. The exact path of the reflected beam which passes through a slit determines the intensity of the optical energy which passes therethrough. The optical energy exiting from the slit is then focused upon a screen. Therefore, the orientation of a mirror directing each of the reflected beams through a corresponding slit determines the intensity for each pixel in the display.

Each of the mirrors is controlled by an actuator comprising one or more electrodisplacive, e.g., piezoelectric or electrostrictive members upon which each mirror is mounted. By applying a DC electrical signal to each of the electrodisplacive members, the electrodisplacive members deform, as is well known in the art, to thereby, e.g., tilt the plane of the reflective surface of the mounted mirror. The amplitude of the DC signal controls the degree of the tilting of the mounted mirror. Optical projection video display systems and various configurations of such actuated mirror arrays are disclosed in, e.g., U.S. Pat. Nos. 5,085,497; 5,175,465; and 5,185,660.

In a copending, commonly assigned application, U.S. Ser. No. 08/216,754, entitled "ACTUATOR ARRAY AND METHOD FOR THE MANUFACTURE THEREOF", there is disclosed yet another actuated mirror array which may be used in such optical projection video display systems. FIG. 1 presents a cross sectional view of the actuated mirror array which comprises a substrate 1, an array 3 of actuators, e.g., 30, 30', 30'' and a corresponding array 5 of mirrors, e g , 50, 50', 50'' . Each of the actuators, e.g., 30, in turn, includes a pair of electrodisplacive members 31a, 31b.

Each electrodisplacive member 31a(31b) has a side surface 32a(32b), a part of a grooved surface 33a(33b), a top surface 34a(34b) and a bottom surface 35a(35b). The side surfaces 32a, 32b of the electrodisplacive members 31a, 31b are in a facing relationship to each other with a first metalization 36 formed therebetween. The grooved surface 33a(33b) is formed between the top surface 34a(34b) of the electrodisplacive member 31a(31b) of the actuator 30 and the top surface 34b'(34a'') of the adjacent electrodisplacive member 31b'(31a'') of an adjacent actuator 30'(30'') with a second metalization 37a(37b) provided thereon. The second metalization 37a(37b) is usually coupled to a common ground potential. On the top surfaces 34a, 34b of the electrodisplacive members 31a, 31b, a mirror 50 is mounted. The bottom surfaces 35a, 35b of the electrodisplacive members 31a, 31b are mounted on the substrate 1.

Prior to the mounting of the actuator 30 on the substrate 1, an opening 11 is formed through the substrate 1 at an intermediate location between the pair of the electrodisplacive members 31a, 31b. A third metalization 12 fills the hole. Further, an electrically conductive adhesive paste 13 is provided on the third metalization 12.

The bottom surfaces 35a, 35b of the electrodisplacive members 31a, 31b are then mounted on the substrate 1 with the first metalization 36 centered around the electrically conductive adhesive paste 13. An addressable driver (not shown) mounted to the lower surface of the substrate 1 may then apply a voltage to the third metalization 12 for a desired tilting of the mirror 50. The voltage may be developed in accordance with the corresponding pixel intensity in an optical projection video display system of the type disclosed in the above-referenced U.S. Pat. No. 5,185,660.

In such actuators, however, the contact resistance between the first metalization 36 and the third metalization 12 can be undesirably increased due to a possible uneven distribution of the conductive particles in the paste 13, which may render inadequate or improper the tilting operation of the mirror 50 upon application of such voltage to the third metalization.

SUMMARY OF THE INVENTION

Therefore, it is a primary object of the present invention to provide an actuator free from such increased contact resistance problem.

In accordance with one aspect of the present invention, there is provided an actuator comprising:

a substrate having an opening therethrough, said opening being filled with a first metalization;

a pair of electrodisplacive members, each of said members having a bottom surface, a side surface, a part of a grooved surface and a top surface, the bottom surfaces of said members being bonded on the substrate, the side surfaces of said members being in a facing relationship to each other with a second metalization formed therebetween, said grooved surface being formed between the top surface of each of said members of said actuator and the top surface of an adjacent electrodisplacive member from an adjacent actuator in an array of such actuators and provided with a third metalization thereon, the top surfaces of said members being attached with a mirror mounted thereon, said members further having a polarization selected so that a voltage applied between their respective second metalization and third metalization causes one of said members to vertically expand and the other to vertically contract, thereby tilting the mounted mirror;

a metal layer having predetermined dimensions, provided underneath said second metalization; and an electrically conductive adhesive paste layer disposed between said first metalization and said metal layer for providing an electrical contact therebetween.

In accordance with another aspect of the invention, there is provided an actuator comprising:

a substrate having an opening therethrough, said opening being filled with a first metalization;

a pair of electrodisplacive members, each of said members having a bottom surface, a side surface, a part of a grooved surface, a part of a recessed surface and a top surface, the bottom surfaces of said members being bonded on the substrate, the side surfaces of said members being in a facing relationship to each other with a second metalization formed therebetween, said grooved surface being formed between the top surface of each of said members of said actuator and the top surface of an adjacent electrodisplacive member from an adjacent actuator in an array of such actuators and provided with a third metalization thereon, said recessed surface being formed between the bottom surface of each of said members of said actuator and the bottom surface of the adjacent electrodisplacive member from the adjacent actuator in the array, the top surfaces of said members being attached with a mirror mounted thereon, said members further having a polarization selected so that a voltage applied between their respective second metalization and third metalization causes one of said members to vertically expand and the other to vertically contract, thereby tilting the mounted mirror;

a metal layer provided over said bottom surfaces of said members; and an electrically conductive adhesive paste layer disposed between said metal layer and said first metalization for providing an electrical contact therebetween.

BRIEF DESCRIPTION OF THE DRAWINGS

The above and other objects, and features of the instant invention will become apparent from the following description of preferred embodiments given in conjunction with the accompanying drawings, in which.

DESCRIPTION OF THE PREFERRED EMBODIMENTS

Figure 1:
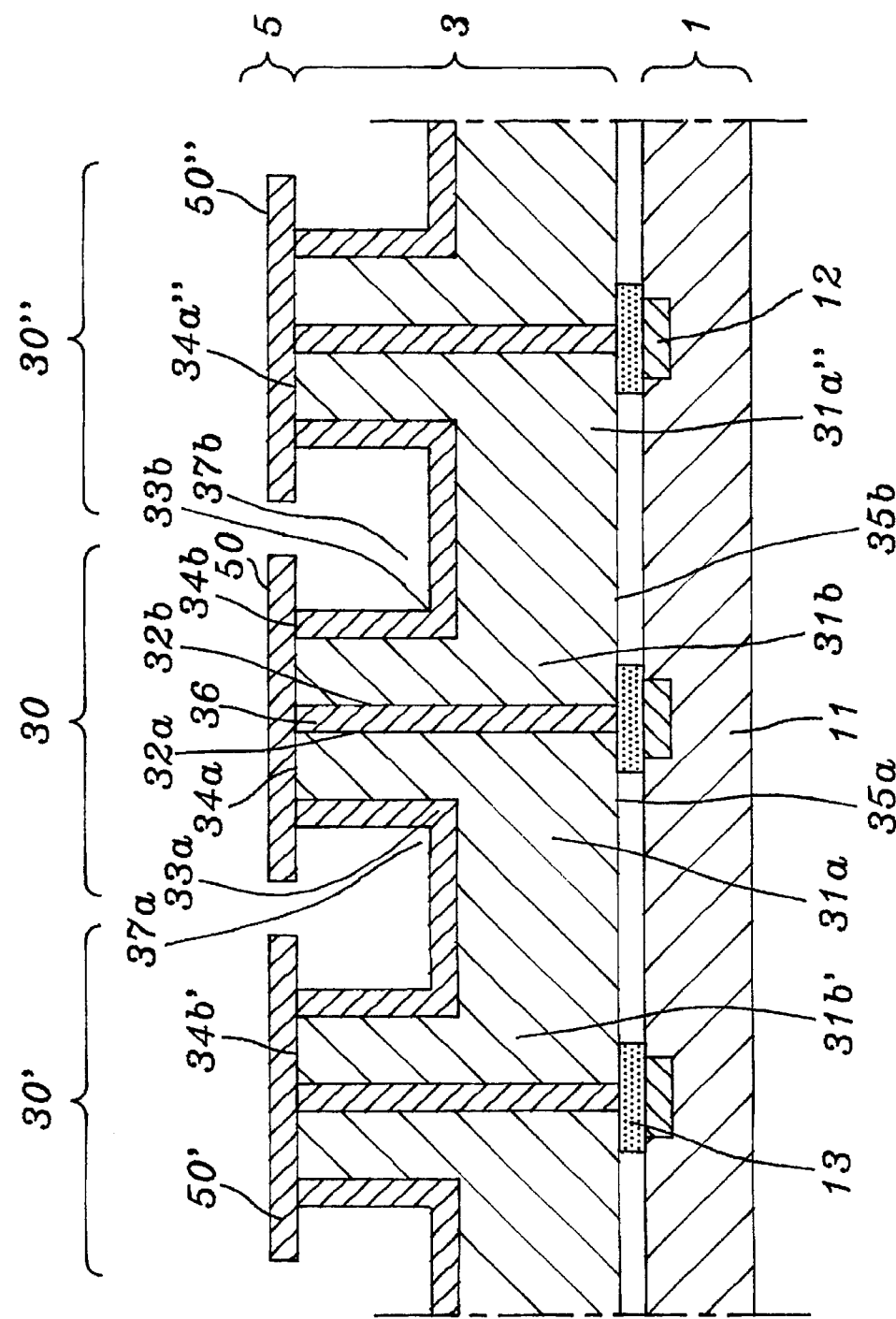
FIG. 1 presents a cross sectional view of a prior actuated mirror array.
Figure 2:
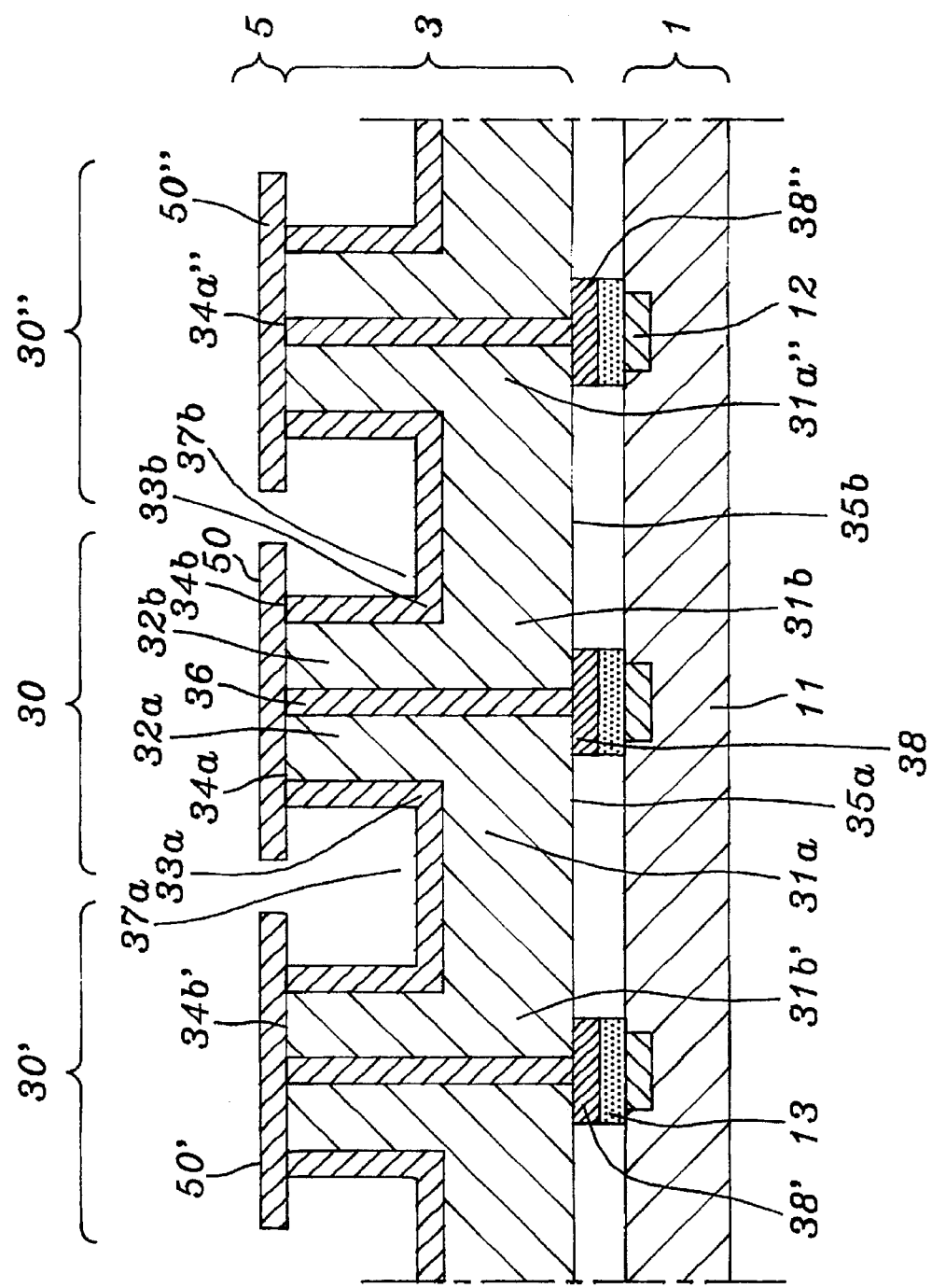
FIG. 2 shows a cross sectional view of an actuated mirror array employing actuators of a preferred embodiment of the present invention.

Referring now to FIG. 2, there is shown a cross sectional view of an actuated mirror array employing actuators of a preferred embodiment of the present invention.

As shown in FIG. 2, the actuated mirror array comprises a substrate 1, an array 3 of actuators, e.g., 30, 30', 30" and a corresponding array 5 of mirrors, e.g., 50, 50', 50".

As the previously described actuator of the copending, commonly assigned application, U.S. Ser. No. 08/216.754, entitled "ACTUATOR ARRAY AND METHOD FOR THE MANUFACTURE THEREOF", each of the actuators, e.g., 30 includes a pair of electrodisplacive members 31a, 31b. (As all of the actuators, e.g., 30, 30', 30", are identical, the following description will be given with respect to the actuator 30 only.)

Further, each electrodisplacive member 31a(31b) has a side surface 32a(32b), a part of a grooved surface 33a(33b), a top surface 34a(34b) and a bottom surface 35a(35b). The side surfaces 32a, 32b of the electrodisplacive members 31a, 31b are in a facing relationship to each other with a first metalization 36 formed therebetween. The grooved surface 33a(33b) is formed between the top surface 34a(34b) of the electrodisplacive member 31a(31b) of the actuator 30 and the top surface 34b'(34a") of the adjacent electrodisplacive member 31b'(31a") of an adjacent actuator 30'(30") with a second metalization 37a(37b) provided thereon. The second metalization 37a(37b) is usually coupled to a common ground potential. On the top surfaces 34a, 34b of the electrodisplacive members 31a, 31b, a mirror 50 is mounted by using. e.g., a method disclosed in another copending, commonly owned application, U.S. Ser. No. 08/216,755, entitled "MIRROR ARRAY AND METHOD FOR THE MANUFACTURE THEREOF". (To perform the mounting, and each mounting described hereinbelow, an epoxy may be used.) The bottom surfaces 35a, 35b of the electrodisplacive members 31a, 31b are mounted on the substrate 1.

The polarization of the electrodisplacive members 31a, 31b is selected so that when a voltage is applied between their respective first metalization 36 and the second metalization 37a or 37b, each member will deform in a vertical direction determined by the polarity of the applied voltage. By placing the side surfaces 32a, 32b of the electrodisplacive members 31a, 31b in a facing relationship, the application of an identical voltage will cause one of the electrodisplacive members 31a, 31b to expand and the other of the electrodisplacive members 31a, 31b to contract vertically, thereby titling the mirror 50 as desired.

To apply such voltage, a third metalization 12 is formed on the substrate 1 by way of, e.g., first forming an opening 11 through the substrate 1 at an intermediate location between the pair of the electrodisplacive members 31a, 31b, and then filling the hole with the third metalization. The third metalization 12 is made to be in electrical contact with the first metalization 36 via an electrically conductive, adhesive, silk-screen printed paste 13 disposed therebetween when the mounting of the actuator 30 on the substrate 1 is completed.

However, unlike the actuator of the copending, commonly assigned application, U.S. Ser. No. 08/216,754, entitled "ACTUATOR ARRAY AND METHOD FOR THE MANUFACTURE THEREOF", in accordance with the preferred embodiment of the present invention, before the mounting of the actuator 30, a thin metal layer 38 having predetermined dimensions is further provided underneath the first metalization 36 by, e.g., sputtering or vapor deposition and photolithography, to be in contact with the paste 13 when the mounting of the actuator 30 on the substrate 1 is completed. The predetermined dimensions are chosen so as to widen the contact area between the first metalization 36 and the paste 13 but not to include such metal layers 38', 38"of the adjacent actuator 30', 30". As a result, a possible increase of the contact resistance between the first metalization 36 and the third metalization 12 can be prevented, rendering the tilting operation of the mirror 50 upon application of a voltage to the first metalization 36 controllable or accurate.

Figure 3:
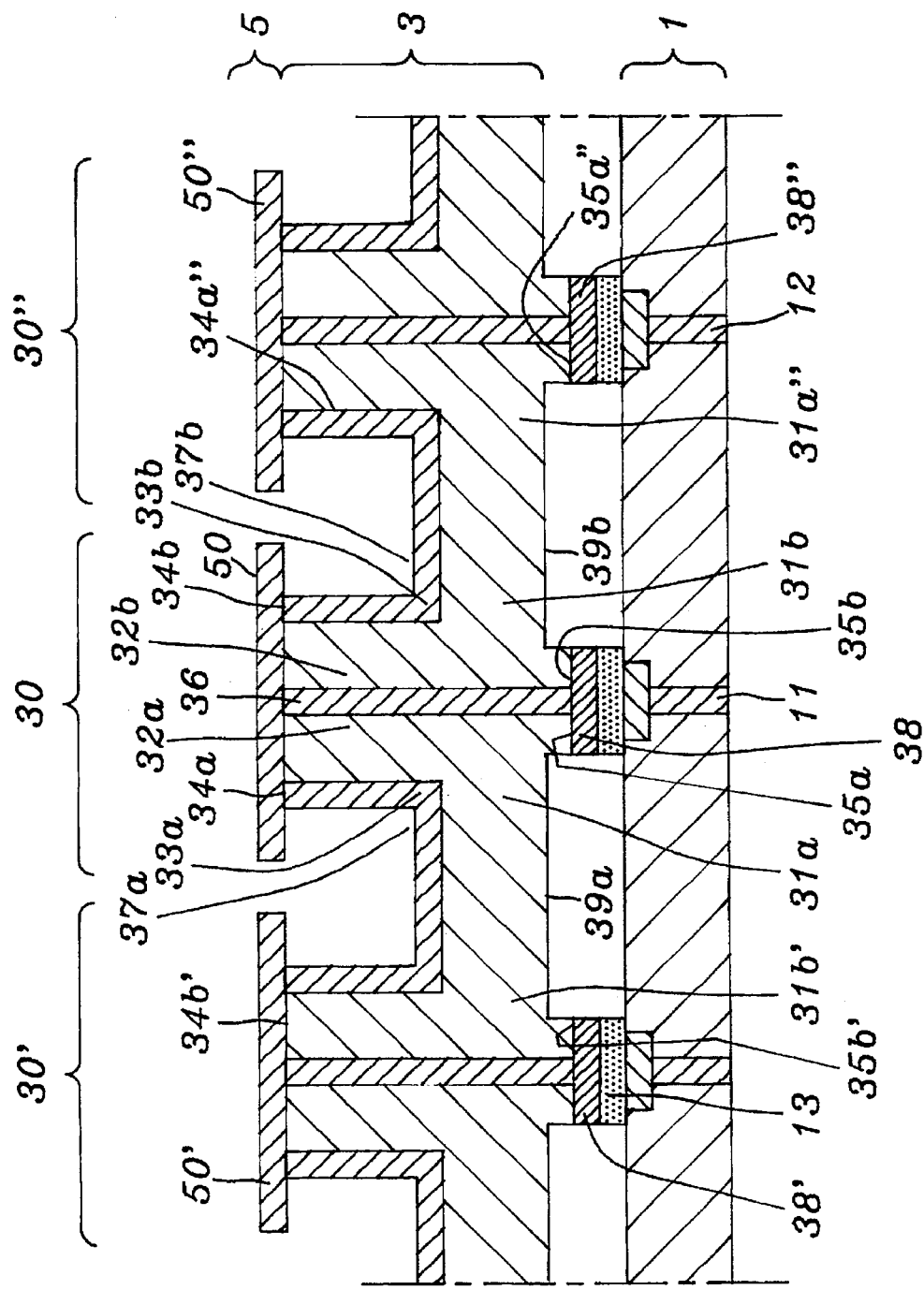
FIG. 3 depicts a cross sectional view of another actuated mirror array employing actuators of another preferred embodiment of the present invention.

Alternatively, as shown in FIG. 3, in accordance with another preferred embodiment of the present invention, also before the mounting of the actuator 30, the bottom surfaces 35a, 35b of the electrodisplacive members 31a, 31b are first metalized by using, e.g., sputtering or vapor deposition, and then both physically and electrically separated from the bottom surfaces 35b', 35a" of the adjacent electrodisplacive members 31b', 31a" of the adjacent actuators 30', 30" by forming two respective recesses 39a, 39b thereamong. Subsequently, electrically conductive adhesive paste 13 is provided over the bottom surfaces 35a, 35b of the electrodisplacive members 31a, 31b by using a known dipping technique. This will eliminate otherwise necessary silk-screen printing of the paste 13 on the third metalization 12. Thereafter, the bottom surfaces 35a, 35b of the electrodisplacive members 31a, 31b are mounted on the substrate 1 proximate the opening 11 while providing a widened electrical contact between the first metalization 36 and the third metalization 12 via the metal layer 38 and the paste 13.

In either of the embodiments, an addressable driver (not shown) mounted to the lower surface of the substrate 1 may then be employed to apply a voltage to the third metalization 12 for a desired tilting of the mirror 50. The voltage may be developed in accordance with the corresponding pixel intensity in an optical projection video display system of the type disclosed in the above-referenced U.S. Pat. No. 5,185,660.

While the present invention has been shown and described with reference to the particular embodiments, it will be apparent to those skilled in the art that many changes and modifications may be made without departing from the spirit and scope of the invention as defined in the appended claims.

What is claimed is:

1. An actuator array for use in an optical projection video display system, comprising:

a substrate with a plurality of first metalizations formed thereon; and a plurality of actuators, wherein each of said actuators includes:

a pair of electrodisplacive members, each of said members having a bottom surface, a side surface, a part of a grooved surface and a top surface, the bottom surfaces of said members being bonded on the substrate, the side surfaces of said members being in a facing relationship to each other with a second metalization formed therebetween, said grooved surface being formed between the top surface of each of said members of said each actuator and the top surface of an adjacent electrodisplacive member from an adjacent actuator in the array, said grooved surface being provided with a third metalization thereon, the top surfaces of said members being attached with a mirror mounted thereon, said members further having a polarization selected so that a voltage applied between their respective second metalization and third metalization causes one of said members to vertically expand and the other to vertically contract, thereby tilting the mounted mirror;

a metal layer having predetermined dimensions, provided underneath said second metalization; and an electrically conductive adhesive paste layer disposed between a respective one of said first metalizations and said metal layer for providing an electrical contact therebetween.

2. The actuator array of claim 1, wherein said predetermined dimensions are selected so as to widen the contact area between said metal layer and said paste layer without forming an electrical contact between said metal layer and adjacent metal layers of actuators adjacent to said actuator in the array.

3. The actuator array of claim 2, wherein said metal layer is formed by sputtering or vapor deposition and photolithography.

4. An actuator array for use in an optical projection video display system, comprising:

a substrate with a plurality of first metalizations formed thereon; and a plurality of actuators, wherein each of said actuators includes:

a pair of electrodisplacive members, each of said members having a bottom surface, a side surface, a part of a grooved surface, a part of a recessed surface and a top surface, the bottom surfaces of said members being bonded on the substrate, the side surfaces of said members being in a facing relationship to each other with a second metalization formed therebetween, said grooved surface being formed between the top surface of each of said members of said each actuator and the top surface of an adjacent electrodisplacive member from an adjacent actuator in the array, said grooved surface being provided with a third metalization thereon, said recessed surface being formed between the bottom surface of each of said members of said each actuator and the bottom surface of the adjacent electrodisplacive member from the adjacent actuator in the array, the top surfaces of said members being attached with a mirror mounted thereon, said members further having a polarization selected so that a voltage applied between their respective second metalization and third metalization causes one of said members to vertically expand and the other to vertically contract, thereby tilting the mounted mirror;

a metal layer provided over said bottom surfaces of said members; and an electrically conductive adhesive paste layer disposed between said metal layer and a respective one of said first metalizations for providing an electrical contact therebetween.

5. The actuator array of claim 4, wherein said recessed surface electrically separates the bottom surface of each of said members of said actuator from the bottom surface of the adjacent electrodisplacive member of the adjacent actuator in the array.

6. The actuator array of claim 4, wherein said metal layer is formed by sputtering or vapor deposition.

7. The actuator array of claim 4, wherein said paste layer is formed by dipping said metal layer into an electrically conductive adhesive paste.

* * * * *